July 14, 1942.   J. E. BUXTON   2,289,626

ENGINE STARTER GEARING

Filed March 30, 1940

Witness:
Burr W. Jones

INVENTOR.
James E. Buxton
BY Clinton S. Jones
ATTORNEY.

Patented July 14, 1942

2,289,626

UNITED STATES PATENT OFFICE 2,289,626

ENGINE STARTER GEARING

James E. Buxton, Elmira Heights, N. Y., assignor to Bendix Aviation Corporation, South Bend, Ind., a corporation of Delaware Application March 30, 1940, Serial No. 326,928

6 Claims. (Cl. 74—7)

The present invention relates to engine starter gearing and more particularly to a starter drive of the automatically meshing and demeshing type incorporating a yielding driving member arranged to be placed under tension and torsion during the operation of the drive.

It is an object of the present invention to provide a novel engine starter drive which is efficient in operation, small in size and simple and economical in construction.

It is another object to provide such a device in which there is incorporated a yielding driving member in the form of a sleeve of elastically deformable material anchored mechanically at its ends.

It is another object to provide such a device in which the sleeve of elastically deformable material is detachably anchored at its ends to a pinion and a control member therefor respectively.

It is another object to provide such a device in which the torsional connections with the ends of the elastically deformable sleeve are effectuated by a compressing and wedging action of the anchorages therefor.

It is another object of the present invention to provide such a device in which the deformable sleeve is placed under tension prior to and during the transmission of torque therethrough.

Figure 1:
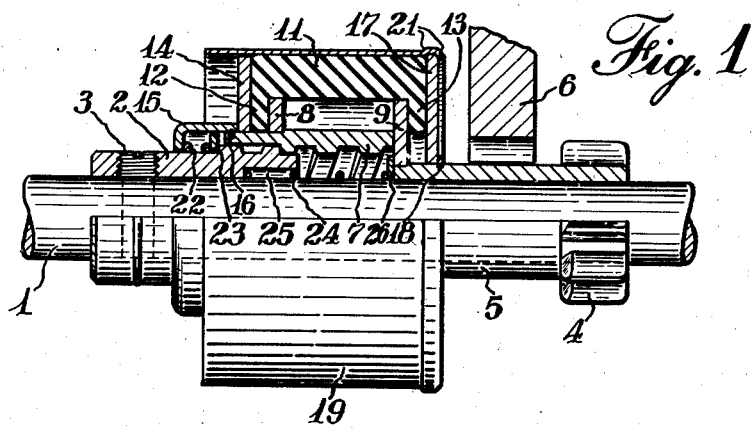
Figure 2:
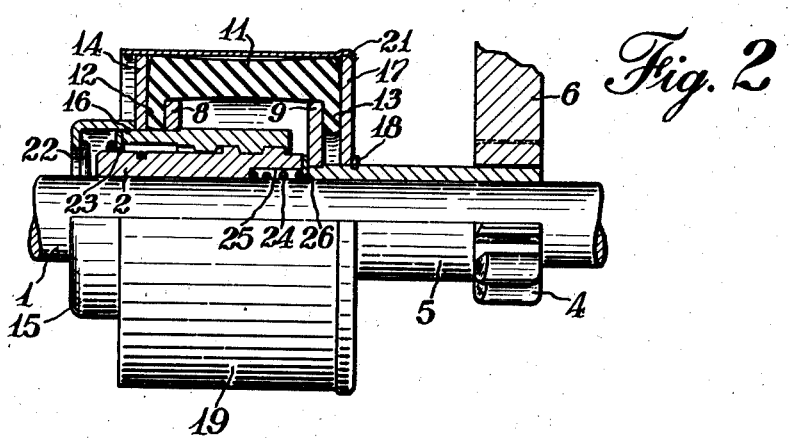

Further objects and advantages will be apparent from the following description taken in connection with the accompanying drawing in which:

Fig. 1 is a side elevation partly in section of a preferred embodiment of the present invention showing the parts in idle position; and Fig. 2 is a similar view showing the parts in operative position.

In Fig. 1 of the drawing there is illustrated a power shaft 1 having a screw shaft 2 fixed thereon in any suitable manner as by means of a pin 3 threaded in the screw shaft and traversing the power shaft.

A pinion member 4 having an extended hub 5 is slidably journalled on the power shaft 1 for movement into and out of engagement with a member such as a flywheel gear 6 of an engine to be started. A control member for the pinion in the form of a nut 7 is threaded on the screw shaft 2 and is provided with a radial flange member 8 fixed in any suitable way on the periphery of said nut. A second flange member 9 of the same external diameter as the flange member 8 is rigidly mounted in any suitable way on the end of the pinion hub 5, and a yielding driving connection in the form of a sleeve 11 of elastically deformable material such as rubber is arranged to surround the control member 7 and the end of the pinion hub 5 and yieldingly connect the same.

In order to form a tractive and torsional connection between the sleeve 11 and the control member 7 and pinion hub 5, said sleeve is provided with inwardly extending shoulders 12 and 13 which are hooked over the flange members 8 and 9 and bear against said flanges. An annular disc or flange member 14 is loosely mounted on the control member 7 and pressed against the end of the sleeve 11 by an abutment thimble 15 which is retained on the control member 7 by suitable means such as a lock ring 16. A second annular disc or flange member 17 is loosely mounted on the pinion hub 5 and maintained pressed against the adjacent end of the sleeve 11 by means of a retaining ring 18. Means for confining the sleeve with its shoulders 12 and 13 pressed between the fixed flange members 8 and 9 and the loose flange members 14 and 17, is provided in the form of a barrel or cup 19 which is preferably spun over the flange member 17 as indicated at 21 and which is interiorly cylindrical in order to allow the flange member 14 to slide longitudinally therein when the sleeve 11 is stretched during the driving operation.

The threads of the screw shaft 2 and control nut 7 are removed for a distance from the adjacent ends thereof so that the control nut may run off the end of the threads of the screw shaft and overrun freely when the pinion rotates faster than the power shaft. Means are provided for causing the threads of the control nut to re-enter the threads of the screw shaft when the screw shaft rotates faster than the control nut, in the form of a spring 22 mounted on the screw shaft within the abutment member 15 and confined by said abutment member against a washer 23 which bears against the ends of the screw shaft threads.

Means normally maintaining the pinion in idle position is provided in the form of an anti-drift spring 24 located between the screw shaft and the pinion hub and arranged to be housed in an enlarged bore 25 of the screw shaft when the pinion is in driving position as illustrated in Fig. 2.

In operation, starting with the parts as illustrated in Fig. 1, rotation of the power shaft 1 by any suitable means such as an electric starting motor, not illustrated, causes the control nut 7 to thread itself to the left on the screw shaft 2, drawing with it the pinion member 4 by means of the yielding sleeve 11 and its anchorages 8, 12, 14 and 9, 13, 17 to the control nut and pinion hub respectively. When the pinion 4 is meshed with the engine gear 6, the end of the pinion hub 5 comes into abutting relation with the end of the screw shaft as illustrated in Fig. 2, a washer 26 being preferably interposed between said elements. Further rotation of the screw shaft 2 by the power shaft 1 causes the nut 7 to stretch the sleeve 11 and apply torque thereto till sufficient rotative force is built up to cause the pinion to rotate and drive the engine gear. When the engine starts, the acceleration of the pinion member 4 by the engine gear 6 causes the control nut 7 to thread itself off the screw shaft 2 whereby the parts are returned to their idle positions as illustrated in Fig. 1 where they are thereafter retained by means of the anti-drift spring 24. It will be noted that there is here provided a very simple and efficient method of anchoring the yielding sleeve at its ends to the control nut and pinion for the purpose of transmitting tension and torsion from the control nut to the pinion.

In case during the meshing operation a tooth of the pinion abuts against a tooth of the flywheel gear, the elasticity of the sleeve 11 permits the longitudinal movement of the pinion 4 to stop until sufficient torque is built up through the coupling sleeve 11 to index the pinion into proper registry of the teeth thereof with the tooth spaces of the flywheel gear, after which the pinion is snapped into mesh with the flywheel gear by the elastic sleeve.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter drive, a power shaft, a screw shaft fixed thereon, a control member threaded on the screw shaft, an engine driving member slidably mounted on the power shaft for movement into and out of engagement with a member of the engine to be started, radial flange members on the control member and engine driving member, a sleeve of elastically deformable material surrounding the control member and said flange members and having inwardly extending shoulders engaging said flange members to resist separation thereof and form a yielding tractive connection between the control member and engine driving member, and means for confining said sleeve against radial movement.

2. In an engine starter drive, a power shaft, a pinion slidable thereon into and out of engagement with a member of an engine to be started, and traversing and driving mechanism for the pinion including a control member, and a sleeve of elastically deformable material connected at its ends to the control member and pinion, the end of the sleeve which is connected to the control member being farthest from the pinion member whereby longitudinal movement of the control member away from the engine member applies tension to the sleeve to draw the pinion into operative position.

3. In an engine starter drive, a power shaft, a pinion slidable thereon into and out of engagement with a member of an engine to be started, and traversing and driving mechanism for the pinion including a control member, a sleeve of elastically deformable material surrounding the control member having inwardly extending shoulders at its ends, and radial flanges on the control member and pinion engaging the inner sides of said shoulders, the end of the sleeve which is connected to the control member being farthest from the pinion member whereby longitudinal movement of the control member away from the engine member applies tension to the sleeve to draw the pinion into operative position.

4. In an engine starter drive, a power shaft, a pinion slidable thereon into and out of engagement with a member of an engine to be started, and traversing and driving mechanism for the pinion including a control member, a sleeve of elastically deformable material surrounding the control member having inwardly extending shoulders at its ends, radial flanges fixed to the control member and pinion engaging the inner sides of said shoulders, and means for preventing radial expansion of the ends of the sleeve, the end of the sleeve which is connected to the control member being farthest from the pinion member whereby longitudinal movement of the control member away from the engine member applies tension to the sleeve to draw the pinion into operative position.

5. In an engine starter drive, a power shaft, a pinion slidable thereon into and out of engagement with a member of an engine to be started, and traversing and driving mechanism for the pinion including an actuating member, a sleeve of elastically deformable material surrounding the actuating member having inwardly extending shoulders at its ends, radial flanges fixed to the actuating member and pinion engaging the inner sides of said shoulders, radial flanges loosely mounted on the actuating member and pinion engaging the ends of the sleeve, means for maintaining said loose flanges pressed against the ends of the sleeve, and means mounted on said loose flanges enclosing and preventing radial expansion of the sleeve.

6. In an engine starter drive, a power shaft, a screw shaft fixed thereto, a pinion member slidably mounted on the power shaft having an extended hub adapted to abut against the screw shaft to define the operative position of the pinion, a control member threaded on the screw shaft, a sleeve of elastically deformable material surrounding the control member having projecting flanges adjacent its ends, means engaging the flanges for preventing axial movement thereof relatively to the control member and pinion hub, and means for preventing radial movement of the sleeve so as to maintain such engagement of the flanges.

JAMES E. BUXTON.